United States Patent Office 3,079,297
Patented Feb. 26, 1963

3,079,297
METHOD OF COMBATING GASTROPODS
Ernst Schraufstatter and Rudolf Gonnert, Wuppertal-Elberfeld, Germany, assignors to Farbenfabriken Bayer Aktiengesellschaft, Leverkusen, Germany, a German corporation
No Drawing. Division of application Ser. No. 847,680, Oct. 21, 1959. Continuation of application Ser. No. 847,679, Oct. 21, 1959. This application May 31, 1960, Ser. No. 32,602
14 Claims. (Cl. 167—31)

The present invention relates to a method for combating gastropods by utilizing the high intrinsic activity against gastropods of compositions having as their active ingredients derivatives of 2-hydroxy-benzoic-anilides. The instant application is a consolidation continuation-in-part of application Serial No. 612,104, filed September 26, 1956, a continuation of application, Serial No. 847,679, filed October 21, 1959, both now abandoned, and a division of application, Serial No. 847,680, filed October 21, 1959.

It is well known that considerable amount of agricultural and horticultural damage is traceable to gastropods. In addition, snails and slugs of this order serve as hosts to many common parasites, as for example the trematodes. The transmitting host or snail releases the final free swimming larval stage of a trematode (cercaria), consisting of a body and tail, into the water where the same encyst on aquatic vegetation, in the skin of fish or in the bodies of crabs and are the infesting stage of trematodes for man and animals. The parasites enter the body via the alimentary tract by ingestion of the uncooked or insufficiently cooked fish, crustaceans and vegetation, through drinking infested water or through the skin of person or animals bathing or wading in the infested water.

Thus, it is most important from the public health standpoint not only to treat the disease entity once it has occurred, but to wipe out the gastropod and thus the source of the disease. It can be appreciated that in countries where epidemics of these diseases occur a satisfactory method of combating the gastropod invertebrate host, i.e., the snail, can be of great and special importance.

The most commonly known agent used in destroying the gastropod is copper sulfate. However, the same is not specific and additionally is not statistically effective. The use of 5,5'-dibromo-salicil and pentachlorophenol has been suggested for combating gastropods. However, the same do not exhibit specificity and additionally must be used in very high concentrations.

It is an object of the present invention to provide a method for combating gastropods. It is a further object of the invention to provide a method for combating gastropods which is especially effective with respect to snails and slugs, which invertebrate animals cause considerable agricultural and horticultural damage and which are the intermediate hosts of the trematodes and flukes, which are parasitic in man and animals.

In accordance with the invention, it has now been found that compositions which contain certain derivatives of 2-hydroxy-benzoic anilide are effective gastropodicidal agents. These effective gastropodicidal agents are selected from the group of the 2-hydroxy-benzoic anilide derivatives having the formula

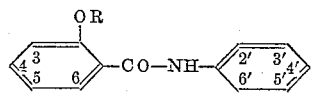

wherein R is hydrogen or a lower alkanoyl radical having from 1 to 4 carbon atoms and which is substituted at one of the numbered positions with a halogen atom and at another numbered position with a member selected from the group consisting of halogen and the nitro group; and further members of the said first mentioned group substituted at a total of up to three additional of the numbered positions with members selected from the group consisting of halogen, methyl and trifluoro methyl, the total number of halogen substituents, however, not exceeding four and the total number of nitro groups not exceeding two.

Here and in the following, chlorine, bromine and iodine are to be understood by "halogen."

A group of particularly active gastropodicidal agents in accordance with the invention have the general formula

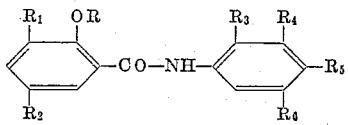

wherein R is hydrogen or a lower alkanoyl radical having from 1 to 4 carbon atoms, $R_1$ is hydrogen or methyl, $R_2$ is chlorine or bromine, $R_3$ and $R_4$ are hydrogen, methyl, chlorine or bromine, or a nitro group, $R_4$ and $R_6$ are hydrogen, chlorine or bromine and wherein always only one nitro group and at most three halogen substituents are present.

By way of example of derivatives of 2-hydroxy-benzoicanilide, to which the invention relates, mention is made of the following notably useful and more or less readily producible compounds:

| | Melting Point, ° C. |
|---|---|
| 5-chloro-4'-nitrosalicylanilide | 260 |
| 5,2'-dichloro-4'-nitrosalicylanilide | 233 |
| 5-nitro-4'-chlorosalicylanilide | 252 |
| 3,5,4'-trichlorosalicylanilide | 192 |
| 5,3',5'-trichloro-2'-nitrosalicylanilide | 190 |
| 5,2',5'-trichloro-4'-nitrosalicylanilide | 218 |
| 5,2'-dichloro-5'-trifluoromethylsalicylanilide | 179 |
| 5,2',5'-trichloro-3-methyl-4'-nitrosalicylanilide | 194 |
| 5,5'-dichloro-2'-methyl-4'-nitrosalicylanilide | 235 |
| 5,3'-dichloro-4'-nitrosalicylanilide | 241 |
| 5,2',5'-trichloro-3,4'-dinitrosalicylanilide | 199 |
| 5,2',3',6'-tetrachloro-4'-nitrosalicylanilide | 195 |
| 5,4',6'-trichloro-2'-nitrosalicylanilide | 204 |
| 5-bromo-2',5'-dichloro-4'-nitrosalicylanilide | 234 |
| 5,2',6'-trichloro-4'-nitrosalicylanilide | 230 |
| 3,5,2',5'-tetrachloro-4'-nitrosalicylanilide | 226 |
| 5,4'-dichloro-3-iodosalicylanilide | 185 |
| 5,4'-dichloro-2'-nitrosalicylanilide | 175 |
| 5,2',5'-trichloro-4'-nitro-2-acetoxybenzanilide | 169 |
| 5,2',5'-trichloro-3-methyl-4'-nitro-2-acetoxybenzanilide | 165 |

The preparation of these compounds may be carried out in exactly the same way as the preparation of salicylanilide, i.e., by reacting the corresponding substituted salicylic acid or its derivatives with aniline or its derivatives, as described for example in Annalen der Chemie 210, 341–342; Berichte der Deutschen Chemischen Gesellschaft 22, 2907; Berichte der Deutschen Chemischen Gesellschaft 6, 336; Journal fuer praktische Chemie [2] 16, 442.

The 2-hydroxy-benzoic anilide is the essential active part or basis of the agent used to combat the gastropods. The agent may comprise a single compound or a mixture of compounds selected from the stated class. In all cases, it is assumed that the selected active ingredient or ingredients are present in an effective amount.

It will be understood that in most cases the composition also actually includes a suitable carrier in uniform admixture with the active ingredients, e.g. appropriately distributing the ingredients and facilitating application of the active agent to the surface or other locality of use, as for example for such spreading, penetrating or other special access as may be required of the active ingredients for the anti-gastropodal effect. Thus, the compounds are applied usually in combination with solid carriers, such as talc, chalk, bentonite, clay and comprise for example a dusting powder, or the compounds may be applied in combination with liquid carriers, such as water, aliphatic alcohols, especially lower aliphatic alcohols, such as methanol etc., ketones, especially lower aliphatic ketones such as acetone, methyl-ethyl-ketone etc., acetonitrile or other inert organic solvents. If applied with or in water, salts of the compounds in their aqueous solutions may be used. Examples of salts which may be used in such solutions are the sodium, potassium or ammonium (i.e., alkali group) salts. However, the free 2-hydroxy compounds or their acyl derivatives may also be used in aqueous emulsions with any inert emulsifier, such as soaps, higher alkyl sulfonates, fatty acid esters, polyglycol ethers or esters and the like. Generally, dilutions or solutions in a concentration of $10^{-1}$ to $10^{-7}$ by weight are used, but also higher or lower concentrations may sometimes be convenient.

The agents may also conveniently be employed admixed with other pesticides, insecticides, fungicides, weed killers, fertilizers, etc. The compositions are not merely specific against certain distinct gastropods, but all snails and slugs, and generally mollusci, are destroyed effectively thereby. By way of example, there are mentioned *Australorbis quadelupensis*, Biophalaria species, lymnaea species and Galba species.

The following are a number of specific examples of preparations which are of special value in practical application under various circumstances, as indicated. It will be understood, nevertheless, that these are simply set forth by way of example and that a variety of other combinations may be prepared, including various different combinations of the active ingredients and likewise a variety of carrier and other supplemental materials. In all cases, and indeed elsewhere in this specification, reference to parts or percentages are intended to mean values by weight, unless otherwise specifically indicated.

*Example 1*

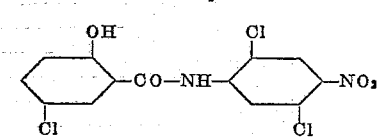

17.2 grams of 5-chloro-salicylic acid and 20.8 grams of 2,5-dichloro-4-nitro-aniline are dissolved in 250 milliliters of xylene. While boiling, there are introduced slowly 5 grams of $PCl_3$. Heating is continued for 3 further hours. The mixture then is allowed to cool down and the crystals which separate are filtered off with suction. The crude 5,2′,5′-trichloro-4′-nitro-salicylic-anilide may be recrystallized from ethanol, melting at 218° C.

*Example 2*

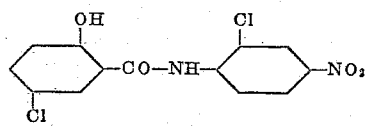

By the same way as described in Example 1, but using equimolecular amounts of 5-chloro-salicylic acid and 2-chloro-4-nitro-aniline, there is obtained the 5,2′-dichloro-4′-nitro-salicylic-anilide, melting at 233° C.

*Example 3*

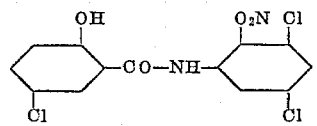

By the same way as described in Example 1, but using equimolecular amounts of 5-chloro-salicylic acid and 2-nitro-3,5-dichloro-aniline, there is obtained the 5,3′,5′-trichloro-2′-nitro-salicylic-anilide, melting at 190° C.

*Example 4*

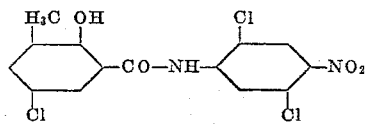

By the same way as described in Example 1, but using equimolecular amounts of 5-chloro-3-methyl-salicylic acid and 4-nitro-2,5-dichloro-aniline, there is obtained the 5,2′,5′-trichloro-3-methyl-4′-nitro-salicylic-anilide, melting at 194° C.

*Example 5*

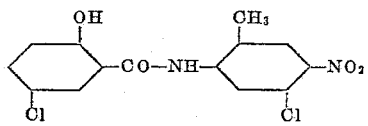

By the same way as described in Example 1, but using equimolecular amounts of 5-chloro-salicylic acid and 5-nitro-4-chloro-o-toluidine, there is obtained the 5,5′-dichloro-2′-methyl-4′-nitro-salicylic-anilide, melting at 235° C.

*Example 6*

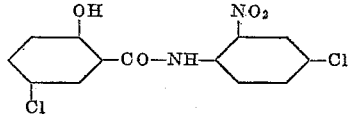

By the same way as described in Example 1, but using equimolecular amounts of 5-chloro-salicylic acid and 4-chloro-2-nitro-aniline, there is obtained the 5,4′-dichloro-2′-nitro-salicylic-anilide, melting at 175° C.

*Example 7*

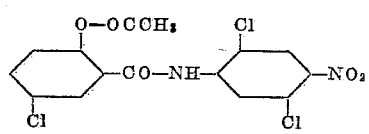

10 grams of 5,2′,5′-trichloro-4′-nitro-salicylic-anilide are dissolved in 30 milliliters of acetic acid anhydride and heated for 1 hour to the boiling point of acetic acid anhydride under reflux. The reaction mixture is allowed to cool down. The crystals are separated by filtration with suction and washed with a small amount of acetic acid. The 5,2′,5′-trichloro-4′-nitro-2-acetoxy-benzanilide obtained is almost pure and melts at 169° C.

*Example 8*

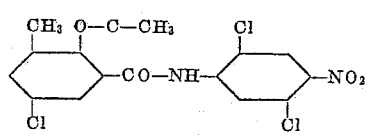

By the same way as described in Example 7, but using the equimolecular amount of 5,2′,5′-trichloro-3-methyl-4′-nitro-salicylic-anilide, there is obtained the 5,2′,5′-trichloro-3-methyl-4′-nitro-2-acetoxy-benzanilide, melting at 165° C.

Example 9

10 snails (*Australorbis quadelupensis*) are placed in containers and then treated with pentachlorophenol (I), 5,5'-dibromo-salicyl (II) and 5,2',5'-trichloro-4'-nitrosalicylanilide (III) and 5,2'-dichloro-4'-nitrosalicylanilide (IV), 5,3',5'-trichloro-2'-nitrosalicylanilide (V), 5,2',5'-trichloro-3-methyl-4'-nitro-2-acetoxybenzanilide (VI), 5,5'-dichloro-2'-methyl-4'-nitrosalicylanilide (VII) and 5,4'-dichloro-2'-nitrosalicylanilide (VIII). In the following table there are given the concentrations effective in producing a 100% death rate of the snails after 24 hours. (The compounds each are used in aqueous solutions or emulsions. The figures below are the ammonium concentrations, i.e., the highest dilutions at which the compounds are effective.)

| Compound | I | II | III | IV | V | VI | VII | VIII |
|---|---|---|---|---|---|---|---|---|
| Concentration | $10^{-5}$ | $10^{-5}$ | $10^{-6.5}$ | $10^{-6.5}$ | $10^{-6.5}$ | $10^{-6.5}$ | $10^{-6.5}$ | $10^{6.5}$ |

Example 10

Effective compositions of two useful active ingredients are given in the following two tables, using (*a*) a solid and (*b*) a liquid composition of active ingredient and a carrier:

(*a*) 50 g. of 5,2',5'-trichloro-4'-nitro-salicylanilide, finely divided to particles less than 5μ, and 50 g. of talc. These compounds are well mixed and may be dusted as such or extended with further carriers.

(*b*) 15 g. 5,2',5'-trichloro-4'-nitro-salicylanilide, 80 g. glycol-monobutyl-ether and 5 g. polyglycol-phenyl-ether ($C_8$—$C_{10}$ glycol chain) (Commercial emulsifier). This liquid preparation may be diluted with water and a stable emulsion suitable as an effective molluscicide composition obtained therefrom.

In the following, the preparation of some of the active ingredients is given without restricting the invention to these compounds given:

A suspension in chlorobenzene of 346 grams of 5-chloro-salicylic acid and 346 grams of 2-chloro-4-nitro aniline are heated to 140° C. 64 milliliters of phosphorus trichloride are dropped into the suspension and the mixture heated to 160° C. for a short period. The chloro-benzene is removed by steam distillation and the residue filtered by suction. The product obtained is sufficiently pure for use as molluscicide. After recrystallizing from ethanol, it melts at 233° C.

Analogously:
5,2',5'-dichloro-4'-nitro-salicyl-anilide
5,4'-dichloro-2'-nitro-salicyl-anilide, and
5,2',5'-trichloro-3-methyl-4'-nitro-salicyl anilide.

We claim:

1. The method of combating gastropods which comprises applying to at least one of the gastropods and their habitat a member selected from the group of 2-hydroxy-benzoic anilide derivatives having the formula

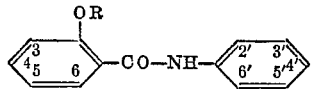

wherein R is a member selected from the group consisting of hydrogen and lower alkanoyl radicals having from one to four carbon atoms and which is substituted at one of the numbered positions with a halogen atom and at another numbered position with a member selected from the group consisting of halogen and the nitro group; and further members of said first mentioned group substituted at a total of up to three additional of the numbered positions with members selected from the group consisting of halogen, nitro, methyl and trifluoromethyl, the total number of halogen substituents however not exceeding four and the total number of nitro groups not exceeding two.

2. Method according to claim 1, wherein said 2-hydroxy-benzoic-anilide derivative is admixed with a carrier.

3. Method according to claim 2, additionally containing an emulsifier.

4. The method of combating gastropods, which comprises applying to at least one of the gastropods and their habitat 5,2'-dichloro-4'-nitrosalicylic acid anilide.

5. The method of combating gastropods, which comprises applying to at least one of the gastropods and their habitat 5,4'-dichloro-2'-nitro-salicylic acid anilide.

6. The method of combating gastropods, which comprises applying to at least one of the gastropods and their habitat 5,2',5-trichloro-2-methyl-4-nitro-salicylic acid anilide.

7. The method of combating gastropods, which comprises applying to at least one of the gastropods and their habitat 5,2',5'-trichloro-4'-nitro-salicylic-anilide.

8. The method of combating gastropods, which comprises applying to at least one of the gastropods and their habitat 5,3',5'-trichloro-2'-nitro-salicylic-anilide.

9. The method of combating gastropods, which comprises applying to at least one of the gastropods and their habitat 5,5'-dichloro-2'-methyl-4'-nitro-salicylic-anilide.

10. The method of combating gastropods, which comprises applying to at least one of the gastropods and their habitat 5,2',5'-trichloro-4'-nitro-2-acetoxy-benzanilide.

11. The method of combating gastropods, which comprises applying to at least one of the gastropods and their habitat 5,2',5'-trichloro-3-methyl-4'-nitro-2-acetoxy-benzanilide.

12. The method of combating gastropods which comprises applying to at least one of the gastropods in their habitat a composition containing as the essential effective ingredient a member selected from the group of 2-hydroxy-benzoic anilide derivatives having the formula

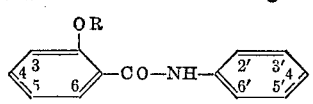

wherein R is a member selected from the group consisting of hydrogen and lower alkanoyl radicals having from one to four carbon atoms and which is substituted at one of the numbered positions with a halogen atom and at another numbered position with a member selected from the group consisting of halogen and the nitro group; and further members of said first mentioned group substituted at a total of up to three additional of the numbered positions with members selected from the group consisting of halogen, nitro, methyl and trifluoromethyl, the total number of halogen substituents however not exceeding four and the total number of nitro groups not exceeding two.

13. Method according to claim 12, wherein said active ingredient is in the form of its salt in solution in water.

14. Method according to claim 12, wherein said composition comprises an aqueous solution having a concentration of between $10^{-1}$ to $10^{-7}$ by weight of said active ingredient.

References Cited in the file of this patent
UNITED STATES PATENTS

| 2,703,301 | Shumard | Mar. 1, 1955 |
| 2,703,332 | Bindler et al. | Mar. 1, 1955 |

FOREIGN PATENTS

| 427,270 | Great Britain | May 22, 1935 |

UNITED STATES PATENT OFFICE
CERTIFICATE OF CORRECTION

Patent No. 3,079,297                     February 26, 1963

Ernst Schraufstatter et al.

It is hereby certified that error appears in the above numbered patent requiring correction and that the said Letters Patent should read as corrected below.

Column 1, line 35, for "person" read -- persons --; column 4, line 74, before "acetoxy" strike out the comma; column 5, in the table, under the heading VIII, for "$10^{6.5}$" read -- $10^{-6.5}$ --; column 6, line 16, for "2-methyl-4-nitro-" read -- 3-methyl-4'-nitro- --.

Signed and sealed this 24th day of September 1963.

(SEAL)
Attest:

ERNEST W. SWIDER
Attesting Officer

DAVID L. LADD
Commissioner of Patents